United States Patent [19]
Diana

[11] 3,717,648
[45] Feb. 20, 1973

[54] 1-PHENYL-AZACARBOCYCLIC-2-IMINES

[75] Inventor: Guy D. Diana, East Nassau, N.Y.

[73] Assignee: Sterling Drug, Inc., New York, N.Y.

[22] Filed: Oct. 21, 1970

[21] Appl. No.: 82,799

Related U.S. Application Data

[63] Continuation-in-part of Ser. No. 733,323, May 31, 1968, abandoned.

[52] U.S. Cl...260/293.78, 260/239 BE, 260/239 BF, 260/239.3 R, 260/293.76, 260/293.77, 260/294.8 H, 260/295 E, 260/296 R, 260/326.3, 260/326.5 FL, 260/326.5 N, 260/326.9, 424/244, 424/263, 424/274
[51] Int. Cl.............................................C07d 29/26
[58] Field of Search.........260/293.78, 326.85, 239 B

[56] References Cited
OTHER PUBLICATIONS

Moriconi et al., Chem. Abstracts 69:28159t
Vasil'eva et al., Izv. Akad. Navk SSSR, Ser. Khim. 1966 (2), pp. 263–267.
Kwok t al., J. Org. Chem. 32, pp. 738–740 (1967)

*Primary Examiner*—John D. Randolph
*Assistant Examiner*—G. Thomas Todd
*Attorney*—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

The compounds of this invention are novel 1-phenyl-3-azacarbocyclic-ureas and -thioureas and intermediates therefor which have anthelmintic activity. They are prepared by the reaction of azacarbocyclicamines or azacarbocyclicimines with appropriate phenyl isocyanates or phenyl isothiocyanates.

10 Claims, No Drawings

1-PHENYL-AZACARBOCYCLIC-2-IMINES

This application is a continuation-in-part of copending application, Ser. No. 733,323, filed May 31, 1968, now abandoned.

This invention relates to novel 1-phenyl-3-azacarbocyclic-ureas and -thioureas, to their preparation and to intermediates therefor.

In one aspect of this invention, there is provided novel 1-phenyl-3-azacarbocyclic-ureas and -thioureas of the formula

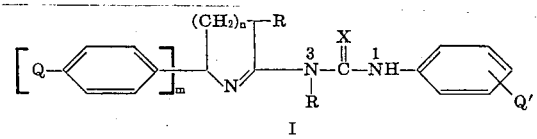

where X is O or S; R is hydrogen or halo; $R_1$ is hydrogen or lower-alkyl; Q is hydrogen, lower-alkyl, lower-alkoxy, trifluoromethoxy, trihalomethyl, phenyl-lower-alkoxy, hydroxy, lower-alkylthio or halo; Q' is hydrogen or one to five substituents of the group consisting of lower-alkyl, lower-alkoxy, phenyl-lower-alkoxy, trifluoromethoxy, lower-alkanoyloxy, hydroxy, di(lower-alkyl)-amino, lower-alkanoylamino, amino, lower-alkylsulfonyl, lower-alkylsulfinyl, lower-alkylthio, trihalomethyl, nitro and halo; n is an integer from 1 to 3; and m is an integer from 0 to 1.

Another aspect of this invention provides novel 1-phenyl-3-azacarbocyclic-ureas having the formula

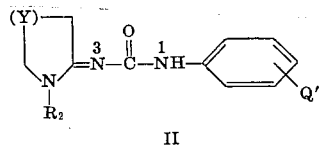

where $R_2$ is lower-alkyl or

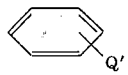

Q' has the meaning defined above for formula I; and Y is alkylene.

Still another aspect of this invention provides novel azacarbocyclicamines of the formula

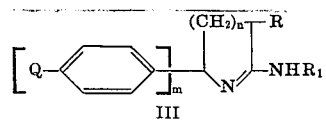

where R is hydrogen or halo; $R_1$ is hydrogen or lower-alkyl; Q is hydrogen, lower-alkyl, lower-alkoxy, trifluoromethoxy, trihalo-methyl, phenyl-lower-alkoxy, lower-alkylthio or halo; n is an integer from 1 to 3; and m is an integer from 0 to 1, except when R is hydrogen m is the integer 1.

The compounds of formula I, formula II and formula III are useful as anthelmintic agents.

In addition to their pharmacodynamic activity, more fully described hereinbelow, the novel compounds of formula III are useful as intermediates in the preparation of the novel 1-phenyl-3-azacarbocyclic-ureas and -thioureas of formula I.

Yet another aspect of this invention provides novel azacarboclicimines of the formula

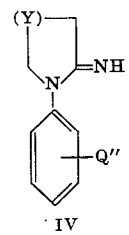

where Q'' is one to five substituents of the group consisting of lower-alkoxy, phenyl-lower-alkoxy, trifluoromethoxy, lower-alkanoyloxy, di(lower-alkyl)amino, lower-alkanoylamino, lower-alkylsulfonyl, lower-alkylsulfinyl, lower-alkylthio, trihalomethyl, nitro and halo; and Y is alkylene.

The novel compounds of formula IV are useful as intermediates in the preparation of novel 1-phenyl-3-azacarbocyclic-ureas within the scope of formula II.

The 1-phenyl-3-azacarbocyclic-ureas and -thioureas of formula I, where $R_1$ is hydrogen, and the intermediate azacarbocyclicamines of formula III of my invention exist in tautomeric forms as illustrated by the formulas

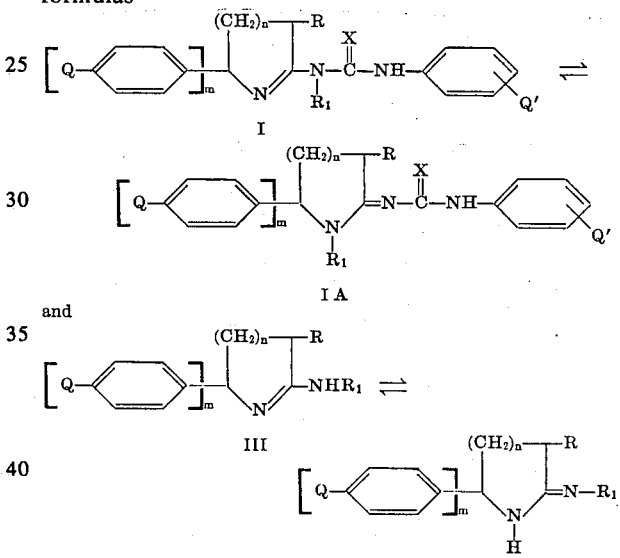

As with all tautomeric systems, the rate of transformation I ⇌ IA and the ratio I/IA and the rate of transformation III ⇌ IIIA and the ratio III/IIIA are dependent on the thermodynamic environment, including the state of aggregation, so that results of measurements by any particular technique do not necessarily have relevance except under the conditions of the measurement, thereby, among other consequences, giving rise to problems for any simple designation of the physical embodiments. Thus, measurement of the infrared spectra in potassium bromide admixture and measurement of the nuclear magnetic resonance spectra are not helpful in determining which tautomeric form, I or IA, or which tautomeric form III or IIIA is present or predominates in any given state of aggregation or solution and therefore the names based on structure I and structure III are preferred although it is understood that either or both structures I and IA and either or both structures III and IIIA are comprehended.

The compounds of formula I are prepared by reacting, in a suitable solvent, that is, a solvent which is essentially inert under the conditions of the reaction, an azacarbocyclic-amine of formula III, above, with a phenyl isocyanate or isothiocyanate of the formula

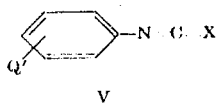

V

The exothermic reaction is carried out by reacting the intermediate compound of formula III with a phenyl isocyanate or isothiocyanate of formula V in an inert solvent, e.g., benzene, acetone or chloroform at temperatures ranging from about 0° C. to the reflux temperature of the reaction mixture, for a period of about 2 to 24 hours.

The reaction is preferably carried out by reacting the intermediate compound of formula III with about one equivalent of a phenyl isocyanate or isothiocyanate of formula V at temperatures ranging from about 0° C. to room temperature for a period of about sixteen hours.

The compounds of formula II are prepared by reacting an azacarbocyclicimine of the formula

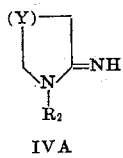

IVA with a phenyl isocyanate of formula V (X=O) using the process described hereinabove for the preparation of the compounds of formula I.

The azacarbocyclicamine of formula III and the azacarbocyclicimine of formula IVA, in the free base form, employed as a starting material in the above-described process, is prepared from the corresponding salt, e.g., the hydrochloride, by reacting such salt with a stoichiometric amount of an appropriate base in a suitable solvent, for example, sodium acetonide in acetone, triethylamine in chloroform, or sodium methoxide in benzene. It is preferred to use the resulting solution of the amine or imine directly in the next step but the amine or imine can be isolated by conventional techniques before use.

The intermediate compound of formula III in its acid-addition salt form is prepared by reaction of a cyclic imino ether of the formula

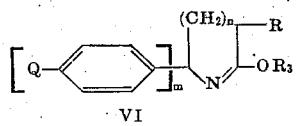

VI where $R_3$ is lower-alkyl, with an acid-addition salt of an amine of the formula

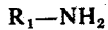

VII

The reaction is carried out in a suitable solvent, e.g., methyl or ethyl alcohol, at room temperature.

The intermediate cyclic imino ether of formula VI can be readily prepared by well-known methods, that is, by the reaction of a lactam of the formula

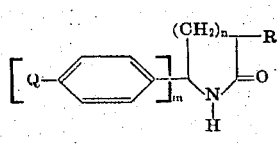

VIII with a lower-alkyl alcohol, e.g., methyl or ethyl alcohol, in the presence of a catalytic amount of an acid, e.g., hydrochloric acid; or with a lower-alkyl orthoformate, e.g., ethyl or methyl orthoformate, in the presence of a catalytic amount of an acid, e.g., hydrochloric acid or p-toluenesulfonic acid. A preferred intermediate cyclic imino ether is the cyclic imino ethyl ether which is prepared by yet another well-known method, e.g., by reacting a compound of formula VIII, in a suitable solvent, e.g., methylene dichloride, with triethyloxonium fluoroborate which can be readily prepared by a known process, that is, by treating boron trifluoride-etherate in ether with epichlorohydrin.

The intermediate lactam of formula VIII, where $m$ is the integer 1 and R is hydrogen, is prepared by reacting a compound of the formula

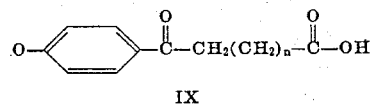

IX with ammonium formate-formic acid at elevated temperatures, e.g., about 150°–200° C., for about 4 to 24 hours.

The intermediate compound of formula IX belongs to a well-known class of compounds and is readily prepared by the Friedel and Craft reaction, that is, by reacting a compound of formula

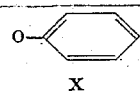

X with a dibasic acid anhydride of the formula

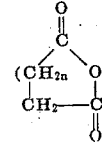

XI or alternatively, where $n$ is 3, with the polymeric anhydride represented by the formula

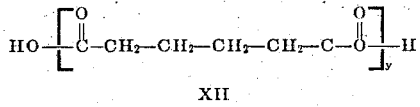

XII where $y$ is a large number indicating the polymeric form of the anhydride. Generally the reactant having formula X is used in excess and thus acts as a solvent for the reaction. However, if required, other solvents can be used such as tetrachloroethane, nitrobenzene and carbon disulfide. Compounds of formulas X, XI and XII are well-known in the art and can be prepared by standard procedures.

The intermediate lactam of formula VIII where R is hydrogen can be further reacted with phosphorus oxychloride-phosphorus pentachloride or with bromine-phosphorus pentachloride to give a di-halo derivative of the formula

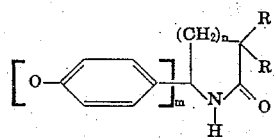

XIII where R is halo, which can be hydrogenated in the presence of palladium-on-charcoal whereby one of the halo substituents is replaced with hydrogen to give the compound of formula VIII where R is halo and Q, n and m have the meaning defined for Q, n and m of formula I.

The intermediate lactams represented by formula VIII where n is the integer from 1 to 3, m is the integer O, and R is hydrogen, are readily available compounds that are well-known in the art.

The intermediate isocyanates and isothiocyanates of formula V belong to a well-known class of compounds and can be readily prepared by conventional methods, for example, by condensing an amine of the formula

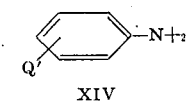

XIV with one equivalent of phosgene or thiophosgene in a suitable solvent, for example toluene, and heating or distilling the resulting carbamyl chloride or thiocarbamyl chloride, whereupon hydrogen chloride is eliminated. The resulting corresponding isocyanate or isothiocyanate can be isolated and purified by standard techniques.

Other well-known procedures that can be used for the preparation of the isocyanate of formula V are the Hoffmann, Curtius, or Lossen rearrangements of an appropriate amide, acid azide, or hydroxamic acid respectively obtained by well-known procedures from the known corresponding carboxylic acid of the formula

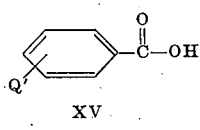

XV

The intermediate compound of formula IVA in its acid addition salt form can be prepared by the reaction of a halo-alkylnitrile of formula $$Z-CH_2(Y)CH_2C \equiv N$$

XVI where Z is halo, with at least an equivalent of an amine of the formula $$R_2-NH_2$$

XVII or, alternatively, where $R_2$ is methyl or

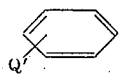

an amine of the formula $$R_2-NHCH_3$$

XVIII

That is, where $R_2$ is methyl or

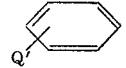

either the amine of formula XVII or of formula XVIII can be used to give the identical corresponding compound of formula IVA, but it is preferred to use the amine of formula XVIII.

The exothermic reaction is generally carried out by heating about equivalent amounts of the reactants at a temperature ranging from about 200° C. to about 300° C. for from about one-half hour to about 10 hours; if desired the reaction can be carried out in a suitable inert solvent. When the amine is low-boiling, the reaction is carried out in a pressure reaction vessel and at temperatures ranging from about 50° C. to about 125° C. for from about one to ten hours.

The intermediate amines of formulas XVII and XVIII belong to a well-known class of compounds. Amines of formula XVIII are readily prepared from amines of formula XVII by known methods, that is, by reacting an amine of formula XVII with methyl orthoformate and hydrolysis of the corresponding N-methyl-formamide with sulfuric acid to the corresponding N-methylamine.

The intermediate haloalkylnitriles of formula XVI are readily available compounds well-known in the art.

Throughout this specification it will be understood that in the above described processes for the preparation of the compound of formula I and the compound of formula II, where applicable, X, R, $R_1$, Q, Q', n and m of formulas III, V, VI, VII, VIII, IX, X, XI, XIII, XIV and XV and $R_2$ and Y of formulas IVA, XVI, XVII and XVIII have the meaning hereinbefore defined for X, R, $R_1$, Q, Q', n and m of formula I and $R_2$ and Y of formula II respectively, except that Q cannot be a hydroxyl substituent and Q' cannot be an amino or a hydroxyl substituent.

The compound of formula I and the compound of formula II where Q' includes one or more amino and/or hydroxy substituents or Q is a hydroxy substituent can be prepared, by well-known catalytic hydrogenation procedures, from the corresponding compounds where Q' includes one or more nitro and/or benzyloxy substituents respectively or Q is a benzyloxy substituent, whereby said substituents are converted to amino and/or hydroxy substituents.

The catalytic hydrogenation can be carried out at room temperature in an inert solvent, e.g., ethyl alcohol, under essentially neutral conditions in the presence of a suitable catalyst, e.g., Raney nickel or palladium-on-charcoal, and at about atmospheric pressure and the hydrogenation is stopped after a stoichiometric amount of hydrogen has reacted.

Throughout this specification it will be understood that Y represents straight or branched alkylene having from one to three carbon atoms as illustrated by $-CH_2-$, $-CH(CH_3)-$, $-CH_2CH_2-$ and $-CH(CH_3)CH_{2c}-$.

Throughout this specification it will be understood that the terms "lower-alkyl," "lower-alkoxy" and "lower-alkanoyl" each mean a group preferably containing from one to six carbon atoms which can be arranged in a straight or branched chain as illustrated, without limiting the generality of the foregoing, by methyl, ethyl, propyl, isopropyl, butyl, sec-butyl, pentyl and hexyl for lower-alkyl, methoxy, ethoxy, isopropoxy, and hexyloxy for lower-alkoxy, and acetyl, propionyl, trimethylacetyl, and caproyl for lower-alkanoyl.

As used throughout this specification the term "-halo" includes chloro, bromo, fluoro and iodo.

Throughout this specification it will be understood that the phenyl ring of the 1-phenyl-3-azacarbocyclic-urea and -thiourea of formula I and of the 1-phenyl-3-azacarbocyclic-urea of formula II which is attached to the urea nitrogen, that is, position 1, the phenyl ring represented by $R_2$ of formula II and the corresponding phenyl rings of the intermediates of formulas IVA, V, XIV, XV, XVII and XVIII can bear the substituents represented by Q' as defined hereinabove at any of the available positions and where there are a plurality of substituents, such substituents can be the same or different and can occur in any of the position combinations relative to each other.

The novel compounds of the instant invention are the compounds of formula I, formula II, formula III and formula IV the acid-addition salts thereof. The compounds of formula I, formula II, formula III and formula IV in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible and are the full equivalents of each other.

It will thus be appreciated that formula I, formula II and formula III not only represent the structural configuration of the bases of formula I, formula II and formula III respectively, but are also representative of the structural entity which is a common to all of my compounds of formula I, formula II and formula III respectively, whether in the form of the free bases or in the form of the acid-addition salts of the bases. I have found that by virtue of this common structural entity, the bases of formula I, formula II and formula III and their acid-addition salts have inherent pharmacodynamic activity of a type more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the compounds of formula I, formula II and formula III, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, the salts of the compounds of formula I, formula II and formula III are useful as characterizing or identifying derivatives of the corresponding free bases or in isolation or purification procedures. Like all of the acid-addition salts, such characterizing or purification salt derivatives can, if desired, be used to regenerate the free bases by reaction of the salts with aqueous base, or alternatively can be converted to other acid-addition salts by, for example, ion-exchange procedures. Thus, by using such purification procedures the pharmaceutically-acceptable free bases of the compounds of formula I, formula II and formula III, or alternatively their pharmaceutically-accepted acid-addition salts, can be prepared.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new compounds of formula I, formula II and formula III and not in any particular acid moiety or acid anion associated with the salt forms of these compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids, such as found, for example, in Beilstein's Organische Chemie, 4th ed., Volumes III, IV, IX, X, XIV, XVII, XIX, XXI, XXII, and XXV; organic mono- and polysulfonic and -sulfinic acids, such as found, for example, in Beilstein Volumes VI, XI, XVI, and XXII; organic phosphonic and phosphinic acids, such as found, for example, in Beilstein Volumes XI and XVI; organic acids of arsenic and antimony, such as found, for example, in Beilstein Volume XVI; organic heterocyclic carboxylic, sulfonic, and sulfinic acids, such as found, for example, in Beilstein Volumes XVIII, XXII, and XXV; acidic ion-exchange resins; and inorganic acids of any acid forming element or combination of elements, such as found in Mellor, Comprehensive Treatise on Inorganic and Theoretical Chemistry, Longman's, Green and Co., New York, N.Y., Volumes I-XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in Volume VI of Beilstein, acidic compounds having "activated" or acidic hydrogen atoms, as for example, picrolonic acid, or barbituric acid derivatives having an acidic proton, such as found, for example, in Cox et al., Medicinal Chemistry, Vol. IV, John Wiley and Sons, Inc., New York, N.Y. (1959). Also comprehended as salt-forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, trifluoroacetic acid, isobutyric acid, alpha-mercaptopropionic acid, malic acid, fumaric acid, oxalic acid, succinic acid, succinamic acid, glutamic acid, tartaric acid, citric acid, pamoic acid, lactic acid, glycolic acid, gluconic acid, saccharic acid, ascorbic acid, penicillin, benzoic acid, 4-methoxybenzoic acid, phthalic acid, salicylic acid, acetylsalicylic acid, anthranilic acid, 1-naphthalenecarboxylic acid, cinnamic acid, cyclohexane-carboxylic acid, mandelic acid, tropic acid, crotonic acid, acetylene dicarboxylic acid, sorbic acid, pyromucic acid, cholic acid, pyrenecarboxylic acid, 2-pyridinecarboxylic acid, 3-indoleacetic acid, quinic acid, sulfamic acid, methane-sulfonic acid, ethanesulfonic acid, benzenesulfinic acid, butylarsonic acid, diethylphosphinic acid, p-aminophenylarsinic acid, phenylstibnic acid, phenylphosphinous acid, methanephosphonic acid, phenylphosphinic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride and the like. The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of formula I, formula II and formula III of this invention have been tested in dogs by standard chemo-therapeutic evaluation procedures described hereinbelow and were found to possess anthelmintic activity, in particular anti-hookworm activity and are useful as anthelmintic agents, in particular as anti-hookworm agents.

TEST PROCEDURE FOR THE DETERMINATION
OF ANTHELMINTIC ACTIVITY

Anti-hookworm Activity: Both naturally infected and artificially infected mongrel dogs were used in the test. The naturally infected dogs carried a burden of two kinds of hookworm (*Uncinaria stenocephala* and *Ancylostoma caninum*). The artificially infected dogs were treated with sufficient hookworm (*Ancylostoma caninum*) larvae approximately one month prior to treatment with a test agent to insure that a mature infection would be present at the time of the test. Food was withheld from the dogs for a minimum of five hours prior to, and for three to five hours after each, administration of the test agent. Equal doses of the test agent were administered orally to from two to three dogs, infected naturally or artificially, one to two doses per dog per day for from one to five consecutive days. The dogs were sacrificed five to eight days post-first medication and the intestines were searched for worms.

The novel compounds of this invention were found to reduce or eliminate the hookworm burden from the infected dogs when administered in the dose range of from 25 to 125 mg./kg. (calculated on the basis of the free base). The number of doses administered ranged from one to two per day for from one to five consecutive days, depending on the severity of the helminth infection.

The actual determination of the numerical biological data definitive for a particular compound is readily determined by standard test procedures by technicians versed in pharmacological test procedures, without the need for any extensive experimentation.

The compounds of formula I, formula II and formula III can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared. Furthermore, if it is desired to broaden the spectrum of activity and/or to secure the advantages of potentiated action, the formulations can have incorporated in them, in addition to the compounds of formula I, formula II and/or formula III, one or more other orally effective anthelmintic and/or potentiating agents. For example such agents, without limiting the generality of the foregoing, can be illustrated by piperazine in the case of ascariasis and enterobiasis; thiabendazole in the case of ascariasis, strongyloidiasis, trichuriasis and trichinosis; pyrvinium in the case of enterobiasis and strongyloidiasis; quinacrine, aspidium, bithionol and niclosamide in the case of tapeworm infections; bithionol in case of trematode infections and biphenium in the case of ascariasis and trichuriasis.

The molecular structures of the compounds of this invention were assigned on the basis of the method of their synthesis and study of their infrared spectra, and confirmed by the correspondence between calculated and found values for the elementary analysis for representative examples.

The following examples will further illustrate the invention without, however, limiting it thereto:

EXAMPLE 1

1-Phenyl-3-(3,4,5,6-tetrahydro-2-pyridyl)urea.

To a mixture, prepared by reacting 5.03 g. sodium with 300 ml. dry acetone, was added 29.6 g. 2-iminopiperidine hydrochloride at room temperature and the mixture was stirred for thirty minutes. A solution of 26.1 g. phenyl isocyanate in 200 ml. dry acetone was added dropwise during one hour and stirring was continued for eighteen hours. The mixture was filtered and the collected solids were slurried in water and collected by filtration. The acetone filtrate was concentrated to dryness under reduced pressure, the residue was treated with 500 ml. ether, and the resulting solid which separated was collected by filtration, combined with the solid obtained above from the water slurry, and recrystallized from isopropyl alcohol to give 30.4 g. 1-phenyl-3-(3,4,5,6-tetrahydro-2-pyridyl)urea; m.p. 153°–154° C.

EXAMPLE 2

1-(4-Chlorophenyl)-3-(3,4,5,6-tetrahydro-2-pyridyl)urea.

To a mixture, prepared by reacting 0.9 g. sodium in 150 ml. dry acetone, was added 5.36 g. 2-iminopiperidine hydrochloride at room temperature and the mixture was stirred for thirty minutes. A solution of 6.1 g. 4-chlorophenyl isocyanate in 20 ml. dry acetone was added dropwise during one hour, stirring was continued for eighteen hours, and the mixture was evaporated to dryness under reduced pressure. A solution of the residue in ether was chilled, filtered and ethereal hydrogen chloride was added until acidic. The resulting solid was collected by filtration, washed with ether and recrystallized from ethyl alcohol to yield 5.5 g. of the hydrochloride of 1-(4-chlorophenyl)-3-(3,4,5,6-tetrahydro-2-pyridyl)urea; m.p. 200°–203° C.

EXAMPLE 3

1-(4-Bromophenyl)-3-(3,4,5,6-tetrahydro-2-pyridyl)urea.

Following a procedure similar to that described in Example 1 but using 5.03 g. sodium in 300 ml. dry acetone, 29.6 g. 2-iminopiperidine hydrochloride, and 43.4 g. 4-bromophenyl isocyanate in 200 ml. dry acetone there was obtained after recrystallization from isopropyl alcohol 48.1 g. 1-(4-bromophenyl)-3-(3,4,5,6-tetrahydro-2-pyridyl)urea; m.p. 142°–145° C.

EXAMPLE 4

1-(4-Bromophenyl)-3-(1-pyrrolin-2-yl)urea.

Following a procedure similar to that described in Example 2 but using 4.6 g. sodium in 300 ml. dry acetone, 23.2 g. 2-amino-1-pyrroline hydrochloride and 38.9 g. 4-bromophenyl isocyanate in 200 ml. dry acetone, there was obtained after recrystallization from ethyl alcohol 10.8 g. of the hydrochloride of 1-(4-bromophenyl)-3-(1-pyrrolin-2-yl)urea; m.p. 221°–224° C.

EXAMPLE 5

1-(4-Chlorophenyl)-3-(1-pyrrolin-2-yl)urea.

Following a procedure similar to that described in Example 1 but using 15.3 g. sodium in 1900 ml. dry acetone, 80 g. 2-amino-1-pyrroline hydrochloride, and 102 g. 4-chlorophenyl isocyanate in 500 ml. dry acetone, except that ice-bath cooling was applied during the addition of the isocyanate, there was obtained after recrystallization from ethyl acetate 66 g. 1-(4-chlorophenyl)-3-(1-pyrrolin-2-yl)urea; m.p. 147°–150° C.

Treatment of a chilled solution of the free base in absolute alcohol with ethereal hydrogen chloride yielded after recrystallization from absolute ethyl alcohol the hydrochloride of 1-(4-chlorophenyl)-3-(1-pyrrolin-2-yl)urea; m.p. 217°–221° C.

EXAMPLE 6

1-(4-Chlorophenyl)-3-(3,4,5,6-tetrahydro-2H-azepin-7-yl)urea.

A. Following a procedure similar to that described in Example 1 but using 3.71 g. sodium in 300 ml. dry acetone, 26.4 g. 7-amino-3,4,5,6-tetrahydro-2H-azepine hydrochloride and 27.3 g. 4-chlorophenyl isocyanate in 200 ml. dry acetone there was obtained after recrystallization from isopropyl alcohol 24 g. 1-(4-chlorophenyl)-3-(3,4,5,6-tetrahydro-2H-azepin-7-yl)urea; m.p. 142°–142.5° C.

B. The 7-amino-3,4,5,6-tetrahydro-2H-azepine hydrochloride used above was prepared as follows:

To a solution of 45.2 g. 7-ethoxy-3,4,5,6-tetrahydro-2H-azepine in 200 ml. methyl alcohol was added 17.8 g. ammonium chloride at room temperature and the mixture was stirred for two hours. The resulting solution was allowed to stand at room temperature for three days and was then evaporated to dryness to yield after recrystallization from isopropyl alcohol 26.4 g. 7-amino-3,4,5,6-tetrahydro-2H-azepine hydrochloride; m.p. 160°–161° C.

C. The 7-ethoxy-3,4,5,6-tetrahydro-2H-azepine used above was prepared as follows:

To a solution of 91 g. boron trifluoride-etherate in 300 ml. anhydrous ether was added 44.4 g. epichlorohydrin with stirring and at a rate which maintained gentle reflux. The mixture was stirred at room temperature for two hours and the supernatant ether was decanted from the solid triethyloxonium fluoroborate which was then washed several times with anhydrous ether and suspended in 50 ml. dry methylene dichloride. A solution of 45.2 g. hexahydro-2-azepinone in 300 ml. dry methylene dichloride was added dropwise and the solution was stirred at room temperature for sixteen hours. A fifty percent aqueous potassium carbonate solution (76 g.) was added with stirring and the supernatant liquid was separated from the resulting solids by decantation and evaporated to dryness under reduced pressure. The resulting oil was distilled to give 45.2 g. 7-ethoxy-3,4,5,6-tetrahydro-2 H-azepine; b.p. 76°–77° C. (23 mm.); $n^{25}D$ 1.4535.

EXAMPLE 7

1-(4-Chlorophenyl)-3-(3-chloro-3,4,5,6-tetrahydro-2-pyridyl)urea.

A. Following a procedure similar to that described in Example 1 but using 3.3 g. sodium in 300 ml. dry acetone, 24.2 g. 2-amino-3-chloro-3,4,5,6-tetrahydropyridine hydrochloride and 22.1 g. 4-chlorophenyl isocyanate in 200 ml. dry acetone there was obtained after recrystallization from ethyl alcohol 25.6 g. 1-(4chlorophenyl)-3-(3-chloro-3,4,5,6-tetrahydro-2-pyridyl)urea; m.p. 156°–158° C.

B. The 2-amino-3-chloro-3,4,5,6-tetrahydropyridine hydrochloride used above was prepared by a procedure similar to that described in Example 6B. Using 17 g. 3-chloro-2-ethoxy-3,4,5,6-tetrahydropyridine in 150 ml. methyl alcohol and 5.71 g. ammonium chloride there was obtained after recrystallization from ethyl alcohol 8.7 g. 2-amino-3-chloro-3,4,5,6-tetrahydropyridine hydrochloride; m.p. 211.5°–212.5° C.

C. The 3-chloro-2-ethoxy-3,4,5,6-tetrahydropyridine used above was prepared by a procedure similar to that described in Example 6C. Using 32.1 g. boron trifluoride-etherate in 100 ml. anhydrous ether, 16.9 g. epichlorohydrin and 21 g. 3-chloro-2-piperidone in 70 ml. dry methylene dichloride there was obtained after distillation 17 g. 3-chloro-2-ethoxy-3,4,5,6-tetrahydropyridine; b.p. 72°–76° C. (10 mm.); $n^{25}D$ 1.4740.

D. The 3-chloro-2-piperidone used above was prepared as follows:

A mixture of 51 g. 3,3-dichloro-2-piperidone and 82.5 g. sodium acetate trihydrate in 1000 ml. glacial acetic acid was hydrogenated at room temperature over 5 g. ten percent palladium-charcoal at 50 pounds pressure. When the required uptake of hydrogen was completed, the mixture was filtered and the filtrate was treated with fifteen percent aqueous sodium bicarbonate solution until it was no longer acidic and extracted with methylene dichloride. The methylene dichloride extract was dried over sodium sulfate and evaporated to dryness under reduced pressure to give after recrystallization from ethyl acetate 21 g. 3-chloro-2-piperidone; m.p. 118°–119° C.

E. The 3,3-dichloro-2-piperidone used above was prepared as follows:

To a solution of 28 g. 2-piperidone in 500 ml. phosphorus oxychloride cooled to 0° C. was added 188 g. phosphorus pentachloride in small portions while the reaction temperature was maintained between 0° and 10° C. When the addition was completed the mixture was slowly heated to 80° C. and kept at this temperature for four hours. The excess phosphorus oxychloride was removed by distillation under reduced pressure and the residue was poured onto 500 g. crushed ice. The resulting solid (32.4 g.) was collected by filtration. A sample recrystallized from ethyl alcohol had a melting point of 162°–164° C.

EXAMPLE 8

1-(4-Chlorophenyl)-3-(3-bromo-3,4,5,6-tetrahydro-2-pyridyl)urea.

A. Following a procedure similar to that described in Example 1 but using 2.05 g. sodium in 300 ml. dry acetone, 19.1 g. 2-amino-3-bromo-3,4,5,6-tetrahydropyridine hydrochloride and 13.8 g. 4-chlorophenyl isocyanate in 200 ml. dry acetone there was obtained after recrystallization from ethyl alcohol 24 g. 1-(4-chlorophenyl)-3-(3-bromo-3,4,5,6-tetrahydro-2-pyridyl)urea; m.p. 159°–160.5° C.

B. The 2-amino-3-bromo-3,4,5,6-tetrahydropyridine hydrochloride used above was prepared by a procedure similar to that described in Example 6B. Using 22.6 g. 3-bromo-2-ethoxy-3,4,5,6-tetrahydropyridine in 70 ml. methanol and 5.86 g. ammonium chloride there was obtained 15.2 g. 2-amino-3-bromo-3,4,5,6-tetrahydropyridine hydrochloride; m.p. 186°–188° C.

C. The 3-bromo-2-ethoxy-3,4,5,6-tetrahydropyridine used above was prepared by a procedure similar to that described in Example 6C. Using 52.7 g. boron-trifluoride-etherate in 300 ml. anhydrous ether, 25.5 g. epichlorohydrin and 45.8 g. 3-bromo-2-piperidone in 150 ml. methylene dichloride there was obtained after distillation 27 g. 3-bromo-2-ethoxy-3,4,5,6-tetrahydropyridine; b.p. 50°–55°C. (0.3 mm.); $n^{25}D$ 1.5011.

D. The 3-bromo-2-piperidone used above was prepared by a procedure similar to that described in Example 7D. Using 125.4 g. 3,3-dibromo-2-piperidone, 81.7 g. sodium acetate, 1200 ml. glacial acetic acid and 7.7 g. ten percent palladium-charcoal there was obtained after recrystallization from acetone 45.8 g. 3-bromo-2-piperidone; m.p. 134°–136° C.

E. The 3,3-dibromo-2-piperidone used above was prepared as follows:

To a stirred solution of 9.9 g. 2-piperidone in 100 ml. dry chloroform cooled to 0° C. was added 41.6 g. phosphorus pentachloride in portions while the reaction temperature was maintained between 0° and 10° C., after which 0.5 g. zinc chloride was added followed by 32 g. bromine dropwise during thirty minutes. The reaction was allowed to warm to room temperature and stirring was continued for five hours. The chloroform was evaporated under reduced pressure and the residue was stirred into ice-water which was then extracted with chloroform. The chloroform extract was treated with sufficient sodium bisulfite to destroy the excess bromine, washed with water and dried over sodium sulfate. The chloroform was evaporated under reduced pressure to give after recrystallization from acetone 10 g. 3,3-dibromo-2-piperidone; m.p. 173°–174.5° C.

EXAMPLE 9

1-(4-Chlorophenyl)-3-(1-phenyl-2-pyrrolidinylene)urea.

A. To a stirred solution of 15 g. 2-imino-1-phenylpyrrolidine hydrochloride in 200 ml. chloroform was added 7.7 g. triethylamine, stirring was continued several minutes and a solution of 11.8 g. 4-chlorophenyl isocyanate in 50 ml. chloroform was added dropwise. The solution was allowed to stand at room temperature for sixteen hours and was then washed with water and dried over sodium sulfate. The chloroform was evaporated under reduced pressure to give after recrystallization from dimethylformamide 18.5 g. 1-(4-chlorophenyl)-3-(1-phenyl-2-pyrrolidinylene)urea; m.p. 176°–178° C.

B. The 2-imino-1-phenylpyrrolidine hydrochloride used above was prepared as follows:

A solution of 50 g. N-methylaniline and 50 g. 4-chlorobutyronitrile was heated under reflux for one hour and was then cooled to room temperature. The resulting solid was collected by filtration and recrystallized from acetonitrile to give 35 g. 2-imino-1-phenylpyrrolidine hydrochloride; m.p. 219°–221° C.

EXAMPLE 10

1-Phenyl-3-[(1-(4-chlorophenyl)-2-pyrrolidinylene]urea.

A. Following a procedure similar to that described in Example 9 but using 15 g. 2-imino-1-(4-chlorophenyl)pyrrolidine hydrochloride in 200 ml. chloroform, 6.6 g. triethylamine and 7.73 g. phenyl isocyanate in 50 ml. chloroform there was obtained after recrystallization from ethyl alcohol 16.8 g. 1-phenyl-3-[1-(4-chlorophenyl)-2-pyrrolidinylene]urea; m.p. 159°–161° C.

B. The 2-imino-1-(4-chlorophenyl)pyrrolidine hydrochloride used above was prepared as follows:

The temperature of a solution of 9.10 g. 4-chloro-N-methylaniline and 6.63 g. 4-chlorobutyronitrile was increased until gas evolution was noted (200° C.) and the bath temperature was maintained at 205°–210° C. until the gas evolution subsided (45 minutes). The mixture was cooled to room temperature and the resulting solid was dissolved in 25 ml. hot isopropyl alcohol. The solution was cooled to room temperature, 150 ml. ether was added and the mixture was allowed to stand with cooling to 5° C. for 16 hours. The solid was collected by filtration to give after recrystallization from isopropyl alcohol-ether 10 g. 2-imino-1-(4-chlorophenyl)pyrrolidine hydrochloride; m.p. 268°–270° C.

C. The 4-chloro-N-methylaniline used above was prepared as follows:

The temperature of a mixture of 53.6 g. 4-chloroaniline, 79.5 g. methylorthoformate and 2 g. concentrated sulfuric acid, charged into a flask fitted with a fractionating column, was raised at a rate which allowed the gradual distillation of the methanol formed until a bath temperature of 175°–180° C. was reached and the reaction was held at this temperature for thirty minutes. After cooling, the mixture was distilled under reduced pressure [b.p. 141°–143°C. (9 mm.)] to give 47 g. 4-chlorophenyl-N-methylformamide as an oil which slowly solidified to a white solid. This was added to 150 ml. 10 percent aqueous hydrochloric acid and the mixture heated at reflux for one hour. The solution was chilled and treated with 15 percent aqueous sodium hydroxide solution until alkaline and extracted with ether. The ether extract was washed with water, dried over sodium sulfate and evaporated to dryness to give after distillation under reduced pressure 35.5 g. 4-chloro-N-methylaniline; b.p. 102°–104° C. (9 mm.).

EXAMPLE 11

1-(4-Chlorophenyl)-3-[1-(4-chlorophenyl)-2-pyrrolidinylene]urea.

Following a procedure similar to that described in Example 9 but using 15 g. 2-imino-1-(4-chlorophenyl)pyrrolidine hydrochloride in 200 ml. chloroform, 6.6 g. triethylamine and 9.97 g. 4-chlorophenyl isocyanate in 50 ml. chloroform there was obtained after recrystallization from ethyl alcohol 15.4 g. 1-(4-chlorophenyl)-3-[1-(4-chlorophenyl)-2-pyrrolidinylene]urea; m.p. 177°–178° C.

Following a procedure similar to that described in Example 10C but substituting for 4-chloroaniline an equivalent amount of the following:

a. 4-toluidine
b. 4-hexylaniline
c. 4-tert.-pentylaniline
d. 2-benzyloxyaniline
e. 5-(phenylpentoxy)aniline
f. 3-methylsulfinylaniline
g. 4-methylsulfonylaniline
h. 4-hexylsulfonylaniline
i. 3-isobutylsulfonylaniline
j. 4-methylthioaniline
k. 3-hexylthioaniline
l. 4-methoxyaniline
m. 4-hexoxyaniline
n. 4-(trifluoromethoxy)aniline
o. 4-diethylaminoaniline
p. 3-(trifluoromethyl)aniline
q. 4-nitroaniline
r. 4-chloro-2-nitroaniline
s. 4-bromo-2-methylaniline
t. pentachloroaniline
u. 2,4-diiodo-5-methoxyaniline there can be obtained respectively the following:
a. N-methyl-4-toluidine
b. N-methyl-4-hexylaniline
c. N-methyl-4-tert.-pentylaniline
d. N-methyl-2-benzyloxyaniline
e. N-methyl-5-(phenylpentoxy)aniline
f. N-methyl-3-methylsulfinylaniline
g. N-methyl-4-methylsulfonylaniline
h. N-methyl-4-hexylsulfonylaniline
i. N-methyl-3-isobutylsulfonylaniline
j. N-methyl-4-methylthioaniline
k. N-methyl-3-hexylthioaniline
l. N-methyl-4-methoxyaniline
m. N-methyl-4-hexoxyaniline
n. N-methyl-4-(trifluoromethoxy)aniline; b.p. 106°–108° C. (28–30 mm)
o. N-methyl-4-(diethylamino)aniline
p. N-methyl-3-(trifluoromethyl)aniline
q. N-methyl-4-nitroaniline
r. N-methyl-4-chloro-2-nitroaniline
s. N-methyl-4-bromo-2-methylaniline
t. N-methyl-4-pentachloroaniline
u. N-methyl-2,4-diiodo-5-methoxyaniline.

Following a procedure similar to that described in Example 9B but substituting for N-methylaniline an equivalent amount of the following:

a. 4-[4-toluidine
b. N-methyl-5-(phenylpentoxy)aniline
c. N-methyl-3-methylsulfinylaniline
d. N-methyl-4-hexylsulfonylaniline
e. N-methyl-4-methylthioaniline
f. N-methyl-4-hexoxyaniline
g. N-methyl-4-(diethylamino)aniline
h. N-methyl-4-chloro-2-nitroaniline
i. 4-butyramidoaniline
j. dimethylamine there can be obtained respectively the hydrochlorides of the following:

a. 2-imino-1-(4-tolyl)pyrrolidine
b. 2-imino-1-[5-(phenylpentyloxy)phenyl]pyrrolidine
c. 2-imino-1-(3-methylsulfinylphenyl)pyrrolidine
d. 2-imino-1-(4-hexylsulfonylphenyl)pyrrolidine
e. 2-imino-1-(4-methylthiophenyl)pyrrolidine
f. 2-imino-1-(4-hexoxyphenyl)pyrrolidine
g. 2-imino-1-[4-(diethylamino)phenyl]pyrrolidine
h. 2-imino-1-(4-chloro-2-nitrophenyl)pyrrolidine
i. 2-imino-1-(4-butyramidophenyl)pyrrolidine
j. 2-imino-1-methylpyrrolidine.

Following a procedure similar to that described in Example 9A but substituting for 2-imino-1-phenylpyrrolidine hydrochloride an equivalent of the hydrochlorides of the pyrrolidines listed from (a) to (j) inclusive immediately above there can be obtained the following:

a. 1-(4-chlorophenyl)-3-[1-(4-tolyl)-2-pyrrolidinylene]urea
b. 1-(4-chlorophenyl)-3-{1-[5-(phenylpentyloxy)phenyl]-2-pyrrolidinylene}urea
c. 1-(4-chlorophenyl)-3-[1-(3-methylsulfinylphenyl)-2-pyrrolidinylene]urea
d. 1-(4-chlorophenyl)-3-[1-(4-hexylsulfonylphenyl)-2-pyrrolidinylene]urea
f. 1-(4-chlorophenyl)-3-[1-(4-hexoxyphenyl)-2-pyrrolidinylene]urea g. 1-(4-chlorophenyl)-3-{1-[4-(diethylamino]-2-pyrrolidinylene}urea
h. 1-(4-chlorophenyl)-3-[1-(4-chloro-2-nitrophenyl)-2-pyrrolidinylene]urea
i. 1-(4-chlorophenyl)-3-[1-(4-butyramidophenyl)-2-pyrrolidinylene]urea
j. 1-(4-chlorophenyl)-3-(1-methyl-2-pyrrolidinylene Following a procedure similar to that described in Example 9B but substituting for 4-chlorobutyronitrile an equivalent amount of 5-chlorovaleronitrile and for N-methyl-aniline an equivalent amount of the following:

a. N-methyl-4-chloroaniline
b. N-methyl-4-hexylaniline
c. N-ethyl-4-methylsulfonylaniline
d. N-methyl-3-hexylthioaniline
e. N-methyl-4-methoxyaniline
f. N-methyl-4-trifluoromethoxyaniline
g. N-methyl-3-trifluoromethylaniline
h. N-methyl-4-nitroaniline
i. N-methyl-2-benzyloxyaniline
j. N-methyl-pentachloroaniline
k. N-methyl-4-acetoxyaniline
l. N-methyl-4-acetamidoaniline
m. N-isopropylamine there can be obtained respectively the hydrochlorides of the following:

a. 2-imino-1-(4-chlorophenyl)piperidine; m.p. (hydrochloride) 250°–25° C. (isopropyl alcohol-ether)
b. 2-imino-1-(4-hexylphenyl)piperidine
c. 2-imino-1-(4-methylsulfonylphenyl)piperidine
d. 2-imino-1-(3-hexythiophenyl)piperidine
e. 2-imino-1-(4-methoxyphenyl)piperidine
f. 2-imino-1-(4-trifluoromethoxyphenyl)piperidine; m.p. (hydrochloride) 264–266° C. (acetone-acetonitrile)
g. 2-imino-1-(4-trifluoromethylphenyl)piperidine
h. 2-imino-1-(4-nitrophenyl)piperidine
i. 2-imino-1-(2-benzyloxyphenyl)piperidine
j. 2-imino-1-(pentachlorophenyl)piperidine
k. 2-imino-1-(4-acetoxyphenyl)piperidine
l. 2-imino-1-(4-acetamidophenyl)piperidine
m. 2-imino-1-isopropylpiperidine.

By following a procedure similar to that described in Example 9A but substituting for 2-imino-1-phenylpyrrolidine hydrochloride an equivalent amount of the hydrochlorides of the piperidines listed from (a) to (m) inclusive immediately above there can be obtained the following:

a. 1-(4-chlorophenyl)-3-[1-(4-chlorophenyl)-2-piperidinylene]urea
b. 1-(4-chlorophenyl)-3-[1-(4-hexylphenyl)-2-piperidinylene]urea
c. 1-(4-chlorophenyl)-3-[1-(4-methylsulfonylphenyl)-2-piperidinylene]urea
d. 1-(4-chlorophenyl)-3-[1-(3-hexylthiophenyl)-2-piperidinylene]-urea
e. 1-(4-chlorophenyl)-3-[1-(4-methoxyphenyl)-2-piperidinylene]urea
f. 1-(4-chlorophenyl)-3-[1-(4-trifluoromethoxyphenyl)-2-piperidinylene]urea
g. 1-(4-chlorophenyl)3-[1-(4-trifluoromethyl)-2-piperidinylene]urea
h. 1-(4-chlorophenyl)-3-[1-(4-nitrophenyl)-2-piperidinylene]urea
i. 1-(4-chlorophenyl)-3-[1-(2-benzyloxyphenyl)-2-piperidinylene]urea
j. 1-(4-chlorophenyl)-3-[1-(pentachlorophenyl)-2-piperidinylene]urea
k. 1-(4-chlorophenyl)-3-[1-(4-acetoxyphenyl)-2-piperidinylene]urea
l. 1-(4-chlorophenyl)-3-[1-(4-acetamidophenyl)-2-piperidinylene]-urea
m. 1-(4-chlorophenyl)-3-(1-isopropyl-2-piperidinylene)urea.

By following the general procedure described hereinbefore for the hydrogenation of nitro and benzyloxy substituents the following compounds:

a. 1-(4-chlorophenyl)-3-[1-(4-nitrophenyl)-2-piperidinylene]urea
b. 1-(4-chlorophenyl)-3-[1-(2-benzyloxyphenyl)-2-piperidinylene]-urea.

can be converted respectively to:

a. 1-(4-chlorophenyl)-3-[1-(4-aminophenyl)-2-piperidinylene]urea
b. 1-(4-chlorophenyl)-3-[1-(2-hydroxyphenyl)-2-piperidinylene]urea.

Following a procedure similar to that described in Example 9B but substituting for 4-chlorobutyronitrile an equivalent amount of 6-chlorocapronitrile and for N-methylaniline an equivalent amount of the following:

a. N-methyl-4-chloroaniline
b. N-methyl-4-tert.-pentylaniline
c. N-methyl-3-isobutylsulfonylaniline
d. N-methyl-4-bromo-2-methylaniline
e. N-methyl-2,4-diiodo-5-methoxyaniline
f. N-hexylamine there can be obtained respectively the hydrochlorides of the following:

a. 2-imino-1-(4-chlorophenyl)hexahydroazepine
b. 2-imino-1(4-tert.-pentylphenyl)hexahydroazepine
c. 2-imino-1-(3-isobutylsulfonylphenyl)hexahydroazepine
d. 2-imino-1-(4-bromo-2-methylphenyl)hexahydroazepine
e. 2-imino-1-(2,4-diiodo-5-methoxyphenyl)hexahydroazepine
f. 2-imino-1-hexylhexahydroazepine.

Following a procedure similar to that described in Example 9A but substituting for 2-imino-1-phenylpyrrolidine hydrochloride an equivalent amount of the hydrochlorides of the hexahydroazepines listed from (a) to (f) inclusive immediately above there can be obtained respectively the following:

a. 1-(4-chlorophenyl)-3-[1-(4-chlorophenyl)hexahydro-2-azepinylene]urea
b. 1-(4-chlorophenyl)-3-[1-(4-tert.-pentylphenyl)hexahydro-2-azepinylene]urea
c. 1-(4-chlorophenyl)-3-[1-(3-isobutylsulfonylphenyl)hexahydro-2azepinylene]urea
d. 1-(4-chlorophenyl)-3-[1-(4-bromo-2-methylphenyl)hexahydro-2-azepinylene]urea
e. 1-(4-chlorophenyl)-3-[1-(2,4-diiodo-5-methoxyphenyl)hexahydro-2-azepinylene]urea
f. 1-(4-chlorophenyl)-3-(1-hexylhexahydro-2-azepinylene)urea.

EXAMPLE 12

1-(4-Chlorophenyl)-3-(3,4,5,6-tetrahydro-6-phenyl-2-pyridyl)urea.

A. A stirred mixture, prepared by reacting 4,1 g. sodium with 255 ml. dry acetone at room temperature, was cooled in an ice bath to 0°–5° C. and 37.6 g. 2-amino-6-phenyl-3,4,5,6-tetrahydropyridine hydrochloride was added in one portion and stirring was continued twenty minutes. A solution of 27.4 g. 4-chlorophenyl isocyanate in 255 ml. dry acetone was then added dropwise during two and one-half hours with continued cooling, the ice bath was removed and stirring was continued for two hours. The resulting solid was collected by filtration and washed with water to give after charcoal treatment and recrystallization from acetone 31.4 g. 1-(4-chlorophenyl)-3-(3,4,5,6-tetrahydro-6-phenyl-2-pyridyl)urea; m.p. 175°–176° C.

B. The 2-amino-6-phenyl-3,4,5,6-tetrahydropyridine hydrochloride used above was prepared as follows:

To a stirred solution of 24.6 g. 2-ethoxy-6-phenyl-3,4,5,6-tetrahydropyridine in 225 ml. absolute methyl alcohol was added 6.48. ammonium chloride at room temperature and stirring was continued for sixteen hours. The solution was evaporated to dryness under reduced pressure to give after recrystallization from isopropyl alcohol 18.1 g. 2-amino-6-phenyl-3,4,5,6-tetrahydropyridine hydrochloride; m.p. 169°–171° C.

C. The 2-ethoxy-6-phenyl-3,4,5,6-tetrahydropyridine used above was prepared as follows:

To a solution of 75 g. boron trifluoride-etherate in 480 ml. anhydrous ether was added 41 g. epichlorohydrin with stirring and at a rate which maintained gentle reflux. The mixture was stirred at room temperature for three hours and the supernatant ether was decanted from the solid triethyloxonium fluoroborate which was then washed several times with anhydrous ether and suspended in 150 ml. methylene dichloride. A solution of 59 g. 6-phenyl-2-piperidone in 300 ml. methylene dichloride was added dropwise and the solution was stirred at room temperature for sixteen hours. A fifty percent aqueous potassium carbonate solution (59.2 g.) was added with stirring the supernatant liquid was separated from the resulting solids by decantation and evaporated to dryness under reduced pressure. The residue was distilled under reduced pressure to give 56.3 g. 2-ethoxy-6-phenyl-3,4,5,6-tetrahydropyridine; b.p. 85°–92° C. (0.04-0.2 mm.).

D. The 6-phenyl-2-piperidone used above was prepared as follows:

To 178 g. ammonium carbonate was added, during one-half hour, 188 g. 85 percent formic acid and the mixture was cautiously heated to 165° C. during a three hour period during which time water and some formic acid were removed by distillation through an 85 cm. Vigreux column. Heating was continued for one and one-half hours at 165° C. after which 92 g. 4-benzoylbutyric acid was added and heating was continued for twenty-two hours. The mixture was cooled to room temperature, ethyl acetate was added with stirring, and the solid was collected by filtration to give after charcoal treatment and recrystallization from acetonitrile 41 g. 6-phenyl-2-piperidone; m.p. 139°–141° C.

E. The 4-benzoylbutyric acid used above was prepared as follows:

To a stirred mixture of 200 g. aluminum chloride in 200 ml. benzene, cooled to 10° C., was added portionwise (10-20 ml. portions) a solution of 75.5 g. glutaric anhydride in 200 ml. benzene during one hour while the temperature was maintained at about 15° C. The resulting mixture was cautiously added in portions to a mixture of 300 g. ice and 100 ml. concentrated hydrochloric acid with stirring and ice bath cooling during which the temperature rose to 60° C. The mixture was steam distilled to remove the benzene, the residue was chilled and the resulting solid was filtered and added slowly to a solution of 80 g. sodium carbonate in 500 ml. water at 80° C. The resulting solution was refluxed fifteen minutes, filtered hot, and acidified at 50°–60° C. by dropwise addition of 130 ml. concentrated hydrochloric acid. The resulting mixture was chilled, filtered, washed with water and dried to give 92 g. 4-benzoylbutyric acid; m.p. 127°–129° C.

By following the procedures similar to those described in Examples 12A, 12B and 12C but substituting respectively an equivalent amount of the following:

a. 2-amino-3-chloro-6-phenyl-3,4,5,6-tetrahydropyridine hydrochloride for 2-amino-6-phenyl-3,4,5,6-tetrahydropyridine hydrochloride b. 2-ethoxy-3-chloro-6-phenyl-3,4,5,6-tetrahydropyridine hydrochloride for 2-ethoxy-6-phenyl-3,4,5,6-tetrahydropyridine hydrochloride c. 3-chloro-6-phenyl-2-piperidone for 6-phenyl-2-piperidone there can be obtained respectively the following:

a. 1-(4-chlorophenyl)-3-(3,4,5,6-tetrahydro-3-chloro-6-phenyl-2-pyridyl)urea b. 2-amino-3-chloro-6-phenyl-3,4,5,6-tetrahydropyridine hydrochloride c. 2-ethoxy-3-chloro-6-phenyl-3,4,5,6-tetrahydropyridine.

The 3-chloro-6-phenyl-2-piperidone above can be prepared by a procedure similar to that described in Example 7D by substituting for 3,3-dichloro-2-piperidone an equivalent amount of 3,3-dichloro-6-phenyl-2-piperidone which in turn can be prepared by a procedure similar to that described in Example 7E by substituting for 2-piperidone an equivalent amount of 6-phenyl-2-piperidone.

EXAMPLE 13

1-(4-Chlorophenyl)-3-[3,4,5,6-tetrahydro-6-(4-chlorophenyl)-2-pyridyl]urea.

A. By following a procedure similar to that described in Example 12A but substituting for 2-amino-6-phenyl-3,4,5,6-tetrahydropyridine hydrochloride an equivalent of 2-amino-6-(4-chlorophenyl)-3,4,5,6-tetrahydropyridine hydrochloride there was obtained 1-(4-chlorophenyl)-3-[3,4,5,6-tetrahydro-6-(4-chlorophenyl)-2-pyridyl]urea; m.p. 173°–175° C.

B. By following a procedure similar to that described in Example 12B but substituting for 2-ethoxy-6-phenyl-3,4,5,6-tetrahydropyridine an equivalent amount of 2-ethoxy-6-(4-chlorophenyl-3,4,5,6-tetrahydropyridine an equivalent amount of 2-ethoxy-6-(4-chlorophenyl)-3,4,5,6-tetrahydropyridine there was obtained after recrystallization from isopropyl alcohol 2-amino-6-(4-chlorophenyl)-3,4,5,6-tetrahydropyridine hydrochloride; m.p. 202°–204° C.

C. By following a procedure similar to that described in Example 12C but substituting for 6-phenyl-2-piperidone an equivalent amount of 6-(4-chlorophenyl)-2-piperidone there was obtained after distillation under reduced pressure 2-ethoxy-6-(4chlorophenyl)-

3,4,5,6-tetrahydropyridine; b.p. 97°–99° C. (0.1-0.12 mm.).

D. By following a procedure similar to that described in Example 12D but substituting for 4-benzoylbutyric acid an equivalent amount of 4-(4-chlorobenzoyl)butyric acid there was obtained after recrystallization from ethyl acetate 6-(4-chloro-phenyl)-2-piperidone; m.p. 149°–151° C.

Following a known procedure described hereinbefore for the preparation of phenyl isocyanates from the corresponding phenylamines there can be obtained from the following anilines:
- a. 4-hexylaniline
- b. 4-tert.-pentylaniline
- c. 4-hexoxyaniline
- d. 5-(phenylpentoxy)aniline
- e. 4-acetoxyaniline
- f. 4-acetamidoaniline
- g. 4-butyramidoaniline
- h. 3-methylsulfinylaniline
- i. 4-hexylsulfonylaniline
- j. 3-isobutylsulfonylaniline
- k. 3-hexylthioaniline
- l. 4-(trifluoromethoxy)aniline
- m. 4-chloro-2-nitroaniline the following isocyanates:
- a. 4-hexylphenyl isocyanate
- b. 4-tert.-pentylphenyl isocyanate
- c. 4-hexoxyphenyl isocyanate
- d. 5-(phenylpentoxy)phenyl isocyanate
- e. 4-acetoxyphenyl isocyanate
- f. 4-acetamidophenyl isocyanate
- g. 4-butyramidophenyl isocyanate
- h. 3-methylsulfinylphenyl isocyanate
- i. 4-hexylsulfonylphenyl isocyanate
- j. 3-isobutylsulfonylphenyl isocyanate
- k. 3-hexylthiophenyl isocyanate
- l. 4-(trifluoromethoxy)phenyl isocyanate
- m. 4-chloro-2-nitrophenyl isocyanate.

Following a procedure similar to that described in Example 2 but substituting for 4-chlorophenyl isocyanate an equivalent amount of the following:
- a. 2-benzyloxyphenyl isocyanate
- b. 4-nitrophenyl isocyanate
- c. 4-tolyl isocyanate
- d. 2-chlorophenyl isocyanate
- e. 2,4-diiodo-5-methoxyphenyl isocyanate there can be obtained respectively the hydrochlorides of the following:
- a. 1-(2-benzyloxyphenyl)-3-(3,4,5,6-tetrahydro-2-pyridyl)urea
- b. 1-(4-nitrophenyl)-3-(3,4,5,6-tetrahydro-2-pyridyl)urea
- c. 1-(4-tolyl)-3-(3,4,5,6-tetrahydro-2-pyridyl)urea, m.p. (free base) 157°–159° C. (isopropyl alcohol)
- d. 1-(2-chlorophenyl)-3-(3,4,5,6-tetrahydro-2-pyridyl)urea
- e. 1-(2,4-diiodo-5-methoxyphenyl)-3-(3,4,5,6-tetrahydro-2-pyridyl)urea.

Following the general procedure hereinbefore described for the hydrogenation of nitro and benzyloxy substituents the following compounds:
- a. 1-(2-benzyloxyphenyl)-3-(3,4,5,6-tetrahydro-2-pyridyl)urea
- b. 1-(4-nitrophenyl)-3-(3,4,5,6-tetrahydro-2-pyridyl)urea can be converted respectively to:
- a. 1-(2-hydroxyphenyl)-3-(3,4,5,6-tetrahydro-2-pyridyl)urea
- b. 1-(4-aminophenyl)-3-(3,4,5,6-tetrahydro-2-pyridyl)urea.

Following a procedure similar to that described in Example 5 but substituting for 4-chlorophenyl isocyanate an equivalent amount of the following:
- a. 4-methylsulfonylphenyl isocyanate
- b. 4-diethylaminophenyl isocyanate
- c. pentachlorophenyl isocyanate
- d. 4-bromo-2-methylphenyl isocyanate
- e. 4-methoxyphenyl isocyanate there can be obtained respectively the hydrochlorides of:
- a. 1-[3-(trifluoromethyl)phenyl]-3-(3,4,5,6-tetrahydro-2H-azepin-7-yl)urea
- b. 1-(4-diethylaminophenyl)-3-(1-pyrrolin-2-yl)urea
- c. 1-(pentachlorophenyl)-3-(1-pyrrolin-2-yl)urea
- d. 1-(4-bromo-2-methylphenyl)-3-(1-pyrrolin-2-yl)urea
- e. 1-(4-methoxyphenyl)-3-(1-pyrrolin-2-yl)urea.

Following a procedure similar to that described in Example 6A but substituting for 4-chlorophenyl isocyanate an equivalent amount of the following:
- a. 3-(trifluoromethyl)phenyl isocyanate
- b. 4-methylthiophenyl isocyanate
- c. 4-(trifluoromethoxy)phenyl isocyanate
- d. 5-(phenylpentoxy)phenyl isocyanate
- e. 4-tert.-pentylphenyl isocyanate there can be obtained respectively the following:
- a. 1-[3-(trifluoromethyl)phenyl]3-(3,4,5,6-tetrahydro-2H-azepin-7-yl)urea
- b. 1-(4-methylthiophenyl)-3-(3,4,5,6-tetrahydro-2H-azepin-7-yl)urea
- c. 1-[4-(trifluoromethoxy)phenyl]3-(3,4,5,6-tetrahydro-2H-azepin-7-yl)urea
- d. 1-[5-(phenylpentoxy)phenyl]-3-(3,4,5,6-tetrahydro-2H-azepin-7yl)urea
- e. 1-(4-tert.-pentylphenyl)-3-(3,4,5,6-tetrahydro-2H-azepin-7-yl)urea.

Following a procedure similar to that described in Example 7 but substituting for 4-chlorophenyl isocyanate an equivalent amount of the following:
- a. 4-hexylphenyl isocyanate
- b. 4-hexoxyphenyl isocyanate
- c. 4-butyramidophenyl isocyanate
- d. 3-isobutylsulfonylphenyl isocyanate there can be obtained respectively the following:
- a. 1-(4-hexylphenyl)-3-(3-chloro-3,4,5,6-tetrahydro-2-piperidyl)urea
- b. 1-(4-hexoxyphenyl)-3-(3-chloro-3,4,5,6-tetrahydro-2-piperidyl)urea
- c. 1-(4-butyramidophenyl)-3-(3-chloro-3,4,5,6-tetrahydro-2-piperidyl)urea
- d. 1-(3-isobutylsulfonylphenyl-3-(3-chloro-3,4,5,6-tetrahydro-2-piperidyl)urea.

Following a procedure similar to that described in Example 12A and substituting for 4-chlorophenyl isocyanate an equivalent amount of:
- a. 4-acetoxyphenyl isocyanate
- b. 4-acetamidophenyl isocyanate
- c. 3-methylsulfinylphenyl isocyanate
- d. 4-hexylsulfonylphenyl isocyanate
- e. 3-hexylthiophenyl isocyanate
- f. 4-chloro-2-nitrophenyl isocyanate there can be obtained the following:

a. 1-(4-acetoxyphenyl)-3-(3,4,5,6-tetrahydro-6-phenyl-2-pyridyl)urea
b. 1-(4-acetamidophenyl)-3-(3,4,5,6-tetrahydro-6-phenyl-2-pyridyl)urea
c. 1-(3-methylsulfinylphenyl)-3-(3,4,5,6-tetrahydro-6-phenyl-2-pyridyl)urea
d. 1-(4-hexylsulfonylphenyl-3-(3,4,5,6-tetrahydro-6-phenyl-2-pyridyl)urea
e. 1-(3-hexylthiophenyl)-3-(3,4,5,6-tetrahydro-6-phenyl-2-pyridyl)urea
f. 1-(4-chloro-2-nitrophenyl)-3-(3,4,5,6-tetrahydro-6-phenyl-2-pyridyl)urea.

Following a procedure similar to that described in Example 12E but substituting for benzene as equivalent amount of:
a. (benzyloxy)benzene
b. (trifluoromethyl)benzene
c. hexylbenzene
d. (hexylthio)benzene
e. (isopropylthio)benzene
f. (methylthio)benzene
g. (trifluoromethoxy)benzene there can be obtained respectively the following:
a. 4-[4-(benzyloxy)benzoyl]butyric acid
b. 4-[4(trifluoromethyl)benzoyl]butyric acid
c. 4-(4-hexylbenzoyl)butyric acid
d. 4-[4-(hexylthio)benzoyl]butyric acid
e. 4-(4-isopropylthiobenzoyl)butyric acid
f. 4-[4-(methylthio)benzoyl]butyric acid 4-(methylthio)benzoyl[
g. 4-[4-(trifluoromethoxy)benzoyl]butyric acid.

Following a procedure similar to that described in Example 12D but substituting for 4-benzoylbutyric acid an equivalent amount of the benzoylalkanoic acids listed from (a) to (g) above as well as the following:
h. 3-benzoylpropionic acid
i. 3-(4-fluorobenzoyl)propionic acid
j. 3-(4-bromobenzoyl)propionic acid
k. 3-(4-iodobenzoyl)propionic acid
l. 3-(4-isopropylbenzoyl)propionic acid
m. 3-(4-toluyl)propionic acid
n. 3-(4-hexoxybenzoyl)propionic acid
o. 3-(4-isobutoxybenzoyl)propionic acid
p. 5-benzoylvaleric acid
q. 5-(4-methoxybenzoyl)valeric acid there can be obtained respectively the following:
a. 6-[4(benzyloxy)phenyl]-2-piperidone
b. 6-[4-(trifluoromethyl)phenyl]-2-piperidone
c. 6-(4-hexylphenyl)-2-piperidone
d. 6-]4-(hexylthio)phenyl]-2-piperidone
e. 6-(4-isopropylthiophenyl)-2-piperidone
f. 6-[4-(methylthio)phenyl]-2-piperidone
g. 6-[4-(trifluoromethoxy)phenyl]-2-piperidone
h. 5-phenyl-2-pyrrolidone
i. 5-(4-fluorophenyl)-2-pyrrolidone
j. 5-(4-bromophenyl-2-pyrrolidone
k. 5-(4-iodophenyl)-2-pyrrolidone
l. 5-(4-isopropylphenyl)-2-pyrrolidone
m. 5-(4-tolyl)-2-pyrrolidone
n. 5-(4-hexoxyphenyl)-2-pyrrolidone
o. 5-(4-isobutoxyphenyl)-2-pyrrolidone
p. 7-phenylhexahydro-2-azepinone
q. 7-(4-methoxyphenyl)hexahydro-2-azepinone.

Following a procedure similar to that described in Example 12C but substituting for 6-phenyl-2-piperidone an equivalent amount of the compounds listed from (a) to (1) immediately above there can be obtained respectively the following:
a. 2-ethoxy-6-[4-(benzyloxy)phenyl]-3,4,5,6-tetrahydropyridine
b. 2-ethoxy-6-[4-(trifluoromethyl)phenyl]-3,4,5,6-tetrahydro-pyridine
c. 2-ethoxy6-(4-hexylphenyl3,4,5,6-tetrahydropyridine
d. 2-ethoxy-6-[4-(hexylthio)phenyl]-3,4,5,6-tetrahydropyridine
e. 2-ethoxy-6-(4-isopropylthiophenyl-3,4,5,6-tetrahydropyridine
f. 2-ethoxy-6-[4-(methylthio)phenyl]-3,4,5,6-tetrahydropyridine
g. 2-ethoxy-6-[4-(trifluoromethoxy)phenyl]-3,4,5,6-tetrahydropyridine
h. 2-ethoxy-5-phenyl-1-pyrroline
i. 2-ethoxy-5-(4-fluorophenyl)-1-pyrroline
j. 2-ethoxy-5-(4-bromophenyl)-1-pyrroline
k. 2-ethoxy-5-(4-iodophenyl)-1-pyrroline
l. 2-ethoxy-5-(4-iospropylphenyl)-1-pyrroline
m. 2-ethoxy-5-(4-tolyl)-1-pyrroline
n. 2-ethoxy-5-(4-hexoxyphenyl)-1-pyrroline
o. 2-ethoxy-5-(4-iosbutoxyphenyl)-1-pyrroline
p. 7-ethoxy-2-phenyl-3,4,5,6-tetrahydro-2H-azepine
q. 7-ethoxy-2-(4-methoxyphenyl)-3,4,5,6-tetrahydro-2H-azepine.

Following a procedure similar to that described in Example 12B but substituting for 2-ethoxy-6-phenyl-3,4,5,6-tetrahydropyridine an equivalent amount of the ethoxy compounds listed from (a) to (q) immediately above there can be obtained respectively the hydrochlorides of the following:
a. 2-amino-6-[4-(benzyloxy)phenyl]-3,4,5,6-tetrahydropyridine
b. 2-amino-6-[4-(trifluoromethyl)phenyl]-3,4,5,6-tetrahydro-pyridine
c. 2-amino-6-(4-hexylphenyl)-3,4,5,6-tetrahydropyridine
d. 2-amino-6-[4-(hexylthio)phenyl]-3,4,5,6-tetrahydropyridine
e. 2-amino-6-(4-isopropylthiophenyl)-3,4,5,6-tetrahydropyridine
f. 2-amino-6-[4-(methylthio)phenyl]-3,4,5,6-tetrahydropyridine
g. 2-amino-6-[4-(trifluoromethoxy)phenyl]-3,4,5,6-tetrahydropyridine
h. 2-amino-5-phenyl-1-pyrroline
i. 2-amino-5-(4-fluorophenyl)-1-pyrroline
j. 2-amino-5-(4-bromophenyl)-1-pyrroline
k. 2-amino-5-(4-iodophenyl)-1-pyrroline
l. 2-amino-5-(4-isopropylphenyl)-1-pyrroline
m. 2-amino-5-(4-tolyl)-1-pyrroline
n. 2-amino-5-(4-hexoxyphenyl)-1-pyrroline
o. 2-amino-5-(4-isobutoxyphenyl)-1-pyrroline
p. 7-amino-2-phenyl-3,4,5,6-tetrahydro-2H-azepine
q. 7-amino-2-(4-methoxyphenyl)-3,4,5,6-tetrahydro-2H-azepine.

Following a procedure similar to that described in Example 12A but substituting for 2-amino-6-phenyl-3,4,5,6-tetrahydropyridine hydrochloride an equivalent of the hydrochlorides of the amino compounds listed from (a) to (q) immediately above there can be obtained respectively the following:
a. 1-(4-chlorophenyl)-3-{3,4,5,6-tetrahydro-6-[4-(benzyloxy)-phenyl]-2-pyridyl}urea b. 1-(4-chlorophenyl)-3-{3,4,5,6-tetrahydro-6-[4-(trifluoro-methyl)phenyl]-2-pyridyl}urea
c. 1-(4-chlorophenyl)-3-[3,4,5,6-tetrahydro-6-(4-hexylphenyl)-2-pyridyl]urea
d. 1-(4-chlorophenyl)-3-{3,4,5,6-tetrahydro-6-[4-(hexylthio)-phenyl]-2-pyridyl}urea
e. 1-(4-chlorophenyl)-3-[3,5,5,6-tetrahydro-6-(4-isopropylthio-phenyl)-2-pyridyl]urea
f. 1-(4-chlorophenyl)-3-{3,4,5,6-tetrahydro-6-[4-(methylthio)-phenyl]-2-pyridyl}urea
g. 1-(4-chlorophenyl)-3-{3,4,5,6-tetrahydro-6-[4-(trifluoro-methoxy)phenyl]-2-pyridyl}urea
h. 1-(4-chlorophenyl)-3-(5-phenyl-1-pyrrolin-2-yl)urea
i. 1-(4-chlorophenyl)-3-[5-(4-fluorophenyl)-1-pyrrolin-2-yl]urea
j. 1-(4-chlorophenyl)-3-[5-(4-bromophenyl)-1-pyrrolin-2-yl]urea
k. 1-(4-chlorophenyl)-3-[5-(4-iodophenyl)-1-pyrrolin-2-yl]urea
l. 1-(4-chlorophenyl)-3-[5-(4-isopropylphenyl)-1-pyrrolin-2-yl]urea
m. 1-(4-chlorophenyl)-3-[5-(4-tolyl)-1-pyrrolin-2-yl]urea
n. 1-(4-chlorophenyl)-3-[5-(4-hexoxyphenyl)-1-pyrrolin-2-yl]urea
o. 1-(4-chlorophenyl)-3-[5-(4-isobutoxyphenyl)-1-pyrrolin-2-yl]urea
p. 1-(4-chlorophenyl)-3-(2-phenyl-3,4,5,6-tetrahydro-2H-azepin-7-yl)urea
q. 1-(4-chlorophenyl)-3-[2-(4-methoxyphenyl)-3,4,5,6-tetrahydro-2H-azepin-7-yl]urea.

By following the general procedure described hereinbefore for the hydrogenation of a benzyloxy substituent the following compounds:

1-(4-chlorophenyl)-3-{3,4,5,6-tetrahydro-6-[4-(benzyloxy)phenyl]-2-pyridyl}urea and
2-amino-6-[4-(benzyloxy)phenyl]-3,4,5,6-tetrahydropyridine can be converted to respectively:

1-(4-chlorophenyl)-3-{3,4,5,6-tetrahydro-6-[4-(hydroxy)phenyl]-2-pyridyl}urea and
2-amino-6-[4-(hydroxy)phenyl]-3,4,5,6-tetrahydropyridine.

Following a procedure similar to that described in Example 12B but substituting for ammonium chloride an equivalent amount of the hydrochlorides of:

a. methylamine
b. isopropylamine
c. hexylamine there can be obtained respectively the hydrochlorides of the following:

a. 2-methylamino-6-phenyl-3,4,5,6-tetrahydropyridine
b. 2-isopropylamino-6-phenyl-3,4,5,6-tetrahydropyridine
c. 2-hexylamino-6-phenyl-3,4,5,6-tetrahydropyridine.

Following a procedure similar to that described in Example 12A but substituting for 2-amino-6-phenyl-3,4,5,6-tetrahydropyridine hydrochloride an equivalent amount of the hydrochlorides of the 2-amino-6-phenyl-3,4,5,6-tetrahydropyridines listed from (a) to (c) immediately above there can be obtained respectively the following:

a. 1-(4-chlorophenyl)-3-methyl-3-(3,4,5,6-tetrahydro-6-phenyl-2-pyridyl)urea
b. 1-(4-chlorophenyl)-3-isopropyl-3-(3,4,5,6-tetrahydro-6-phenyl-2-pyridyl)urea
c. 1-(4-chlorophenyl)-3-hexyl-3-(3,4,5,6-tetrahydro-6-phenyl-2-pyridyl)urea.

EXAMPLES 14–21

Following a procedure similar to that described in Example 12A but substituting in each case for 2-amino-6-phenyl-3,4,5,6-tetrahydropyridine hydrochloride an equivalent amount of 2-amino-6-(4-chlorophenyl)-3,4,5,6-tetrahydropyridine hydro-chloride and for 4-chlorophenyl isocyanate an equivalent amount of 4-methoxyphenyl isocyanate,
4-tolyl isocyanate,
4-ethoxyphenyl isocyanate,
3-(trifluoromethyl)phenyl isocyanate,
4-(trifluoromethoxy)phenyl isocyanate,
4-bromophenyl isocyanate,
4-fluorophenyl isocyanate, and
2-methoxyphenyl isocyanate there were obtained respectively 14. 1-(4-methoxyphenyl)-3-[3,4,5,6-tetrahydro-6-(4-chlorophenyl)-2-pyridyl]urea; m.p. 184°–185° C.,
15. 1-(4-tolyl)-3-[3,4,5,6-tetrahydro-6-(4-chlorophenyl)-2-pyridyl]urea; m.p. 188°–189° C. (ethyl acetate),
16. 1-(4-ethoxyphenyl)-3-[3,4,5,6-tetrahydro-6-(4-chlorophenyl)-2-pyridyl]urea; m.p. 191°–192° C. (benzene),
17. 1-[3-(trifluoromethyl)phenyl]-3-[3,4,5,6-tetrahydro-6-(4-chlorophenyl)-2-pyridyl]urea; m.p. 162°–163° C. (ether),
18. 1-[4-(trifluoromethoxy)phenyl]-3-[3,4,5,6-tetrahydro-6-(4-chlorophenyl)-2-pyridyl]urea; m.p. 148°–150° C. (ether),
19. 1-(4-bromophenyl)-3-[3,4,5,6-tetrahydro-6-(4-chlorophenyl)-2-pyridyl]urea; m.p. 186°–188° C. (acetone),
20. 1-(4-fluorophenyl)-3-[3,4,5,6-tetrahydro-6-(4-chlorophenyl)-2-pyridyl]urea; m.p. 172°–173° C. (ethylene dichloride), and
21. 1-(2-methoxyphenyl)-3-[3,4,5,6-tetrahydro-6-(4-chlorophenyl)-2-pyridyl]urea; m.p. 179°–181° C. (ethylene dichloride).

EXAMPLE 22

1-(4-Methoxyphenyl)-3-[3,4,5,6-tetrahydro-6-(4-chlorophenyl)-2-pyridyl]thiourea

To a mixture prepared by reacting 1.41 g. sodium with 100 ml. dry acetone, was added 15 g. 2-amino-6-(4-chlorophenyl)-3,4,5,6-tetrahydropyridine hydrochloride at room temperature and the mixture was stirred for thirty minutes. A solution of 10.1 g. 4-methoxyphenyl isothiocyanate in 100 ml. dry acetone was added dropwise with cooling and stirring was continued for 15 hours at room temperature. The mixture was filtered and the collected solids were slurried in water and collected by filtration to give 16 g. of 1-(4-methoxyphenyl)-3-[3,4,5,6-tetrahydro-6-(4-chlorophenyl)-2-pyridyl]thiourea, m.p. 155°–157° C. (isopropyl alcohol).

EXAMPLE 23

1-Phenyl-3-[3,4,5,6-tetrahydro-6-(4-chlorophenyl)-2-pyridyl]-thiourea

Following a procedure similar to that described in Example 22 but substituting for 4-methoxyphenyl isothiocyanate an equivalent amount of phenyl isothiocyanate there was obtained 1-phenyl-3-[3,4,5,6-tetrahydro-6-(4-chlorophenyl)-2-pyridyl]thiouria, m.p. 170°–172° C. (ethyl acetate).

EXAMPLE 24

1-(4-Chlorophenyl)-3-(3,4,5,6-tetrahydro-2H-azepin-7-yl)thiourea

To a mixture, prepared by reacting 1.83 g. sodium with 100 ml. dry acetone, was added 11.8 g. 7-amino-3,4,5,6-tetrahydro-2H-azepine hydrochloride at room temperature and the mixture was stirred for fifteen minutes. A solution of 13.5 g. 4-chlorophenyl isothiocyanate in 100 ml. dry acetone was added dropwise during 15 minutes with cooling and stirring was continued at room temperature for 15 hours. The mixture was filtered and the collected solids were slurried in water and collected by filtration. The acetone filtrate was concentrated to dryness under reduced pressure and the residue was slurried in water, filtered and crystallized from ethyl acetate. The combined solids were recrystallized from ethyl acetate to give 13 g. of 1-(4-chlorophenyl)-3-(3,4,5,6-tetrahydro-2H-azepin-7-yl)thiourea, m.p. 141°–142° C.

EXAMPLES 25–28

Following a procedure similar to that described in Example 12A but substituting in each case for 2-amino-6-phenyl-3,4,5,6-tetrahydropyridine hydrochloride an equivalent amount of 2-amino-6-(4-methoxyphenyl)-3,4,5,6-tetrahydropyridine hydrochloride and, in the case of Examples 26–28 inclusive, for
4-chlorophenyl isocyanate an equivalent amount of
4-methoxyphenyl isocyanate,
4-bromophenyl isocyanate, and
4-(trifluoromethoxy)phenyl isocyanate
there were obtained respectively
25. 1-(4-chlorophenyl)-3-[3,4,5,6-tetrahydro-6-(4-methoxyphenyl)-2-pyridyl]urea; m.p. 167°–168° C. (isopropyl alcohol),
26. 1-(4-methoxyphenyl)-3-[3,4,5,6-tetrahydro-6-(4-methoxyphenyl)-2-pyridyl]urea; m.p. 166.5°–167.5° C. (isopropyl alcohol),
27. 1-(4-bromophenyl)-3-[3,4,5,6-tetrahydro-6-(4-methoxyphenyl)-2-pyridyl]urea; m.p. 180°–181° C. (alcohol), and
28. 1-[4-(trifluoromethoxy)phenyl]-3-[3,4,5,6-tetrahydro-6-(4-methoxyphenyl)-2-pyridyl]urea; m.p. 145°–148° C. (ether).

The 2-amino-6-(4-methoxyphenyl)-3,4,5,6-tetrahydro-pyridine hydrochloride [m.p. 175°–177°C. (isopropyl alcohol)] was prepared by following a sequence of procedures similar to those described in Examples 12B–12E inclusive but using respectively the following:
2-ethoxy-6-(4-methoxyphenyl)-3,4,5,6-tetrahydropyridine, b.p. 109°–121°C. (0.1 mm),
6-(4-methoxyphenyl)piperidone, m.p. 104°–109° C. (ethyl acetate),
4-(4-methoxybenzoyl)butyric acid, m.p. 115°–125° C., and anisole.

EXAMPLES 29–30

Following a procedure similar to that described in Example 2 but substituting for 4-chlorophenyl isocyanate an equivalent amount of
4-methoxyphenyl isocyanate, and
3,4-dichlorophenyl isocyanate
there were obtained respectively
29. 1-(4-methoxyphenyl)-3-(3,4,5,6-tetrahydro-2-pyridyl)urea, m.p. 147°–149° C. (isopropyl alcohol), and
30. 1-(3,4-dichlorophenyl)-3-(3,4,5,6-tetrahydro-2-pyridyl)-urea, m.p. 174°–176° C. (ethyl alcohol).

EXAMPLE 31

1-(4-Chlorophenyl)-3-(1-methyl-2-piperidylidene)urea

Following a procedure similar to that described in Example 9A but substituting for 2-imino-1-phenylpyrrolidine hydrochloride an equivalent amount of 2-imino-1-methyl-piperidine hydrochloride there was obtained 1-(4-chlorophenyl)-3-(1-methyl-2-piperidylidene)urea, m.p. 126°–129° C. (ethyl acetate).

The 2-imino-1-methylpiperidine hydrochloride was prepared as follows:

To a stirred solution of 10 g. ammonia and 32.7 g. 1-methylthiopiperidone in 200 ml. ethyl alcohol cooled to 0° C. was added 110 g. of mercuric oxide and stirring was continued at 0° C. for four hours and at room temperature for 15 hours. The mixture was filtered and the filtrate was evaporated to dryness under reduced pressure. The residue was triturated in methanolic hydrogen chloride solution and the resulting solids were collected by filtration and washed with ether to give 11.9 g. of 2-imino-1-methylpiperidine hydrochloride, m.p. 151°–154° C.

Following a procedure similar to that described in Example 10B but using equivalent amounts of the following:
N-methylaniline and 5-chlorovaleronitrile,
N-methyl-3-chloroaniline and 5-bromovaleronitrile,
N-methyl-4-fluoroaniline and 5-chlorovaleronitrile,
N-methyl-4-toluidine and 5-chlorovaleronitrile, and
N-methyl-4-chloroaniline and 4-chloro-3-methylbutyronitrile
there were obtained respectively
a. 2-imino-1-phenylpiperidine hydrochloride, m.p. 224°–226° C.,
b. 2-imino-1-(3-chlorophenyl)piperidine hydrobromide, m.p. 242°–224° C. (acetonitrile),
c. 2-imino-1-(4-fluorophenyl)piperidine hydrochloride, m.p. 248°–250° C. (isopropyl alcohol),
d. 2-imino-1-tolylpiperidine hydrochloride, m.p. 164°–167° C. (acetone), and
e. 2-imino-1-(4-chlorophenyl)-4-methylpyrrolidine hydro-chloride, m.p. 207°–208° C. (isopropyl alcohol-ether).

Following a procedure similar to that described in Example 9A but substituting in each case for 2-imino-1-phenylpyrrolidine hydrochloride an equivalent amount of 2-imino-1-phenylpiperidine hydrochloride and for 4-chlorophenyl isocyanate an equivalent amount of a. 4-hexylphenyl isocyanate,
b. 4-tert-pentylphenyl isocyanate,
c. 4-hexoxyphenyl isocyanate,
d. 4-(5-phenylpentoxy)phenyl isocyanate, and
e. 4-acetoxyphenyl isocyanate respectively there can be obtained
a. 1-(4-hexylphenyl)-3-(1-phenyl-2-piperidinylene)urea,
b. 1-(4-tert-pentylphenyl)-3-(1-phenyl-2-piperidinylene)urea,
c. 1-(4-hexoxyphenyl)-3-(1-phenyl-2-piperidinylene)urea,
d. 1-[4-(5-phenylpentoxy)phenyl]-3-(1-phenyl-2-piperidinylene)-urea, and
e. 1-(4-acetoxyphenyl)-3-(1-phenyl-2-piperidinylene)urea.

Following a procedure similar to that described in Example 9A but substituting in each case for 2-imino-1-phenylpyrrolidine hydrochloride an equivalent amount of 2-imino-1-(3-chlorophenyl)piperidine hydrobromide and for 4-chlorophenyl isocyanate an equivalent amount of
a. 4-acetamidophenyl isocyanate,
b. 4-butyramidophenyl isocyanate,
c. 3-methylsulfinylphenyl isocyanate,
d. 4-hexylsulfonylphenyl isocyanate, and
e. 3-isobutylsulfonylphenyl isocyanate there can be obtained respectively
a. 1-(4-acetamidophenyl)-3-[1-(3-chlorophenyl)-2-piperidinylene]urea,
b. 1-(4-butyramidophenyl)-3-[1-(3-chlorophenyl)-2-piperidinylene]urea,
c. 1-(3-methylsulfinylphenyl)-3-[1-(3-chlorophenyl)-2-piperidinylene]urea,
d. 1-(4-hexylsulfonylphenyl)-3-[1-(3-chlorophenyl)-2-piperidinylene]urea, and
e. 1-(3-isobutylsulfonylphenyl)-3-[1-(3-chlorophenyl)-2-piperidinylene]urea.

Following a procedure similar to that described in Example 9A but substituting in each case for 2-imino-1-phenylpyrrolidine hydrochloride an equivalent amount of 2-imino-1-(4-fluorophenyl)piperidine hydrochloride and for 4-chlorophenyl isocyanate an equivalent amount of
a. 3-hexylthiophenyl isocyanate,
b. 4-(trifluoromethoxy)phenyl isocyanate,
c. 4-chloro-2-nitrophenyl isocyanate,
d. 4-tolyl isocyanate,
e. 2,4-diiodo-5-methoxyphenyl isocyanate,
f. 4-methylsulfonylphenyl isocyanate, and
g. 4-diethylaminophenyl isocyanate there can be obtained respectively
a. 1-(3-hexylthiophenyl)-3-[1-(4-fluorophenyl)-2-piperidinylene]-urea,
b. 1-[4-(trifluoromethoxy)phenyl]3-[1-(4-fluorophenyl)-2-piperidinylene]urea,
c. 1(4-chloro-2-nitrophenyl)-3-[1-(4-fluorophenyl)-2-piperidinylene]urea,
d. 1-(4-tolyl)-3-[1-(4-fluorophenyl)-2-piperidinylene]urea,
e. 1-(2,4-diiodo-5-methoxyphenyl)-3-[1-(4-fluorophenyl)-2-piperidinylene]urea,
f. 1-(4-methylsulfonylphenyl)-3-[1-(4-fluorophenyl)-2-piperidinylene]urea, and
g. 1-(4-diethylaminophenyl)-3-[1-(4-fluorophenyl)-2-piperidinylene]urea.

Following a procedure similar to that described in Example 9A but substituting in each case for 2-imino-1-phenyl-pyrrolidine hydrochloride an equivalent amount of 2-imino-1-tolylpiperidine hydrochloride and for 4-chlorophenyl isocyanate an equivalent amount of
a. pentachlorophenyl isocyanate,
b. 4-bromo-2-methylphenyl isocyanate,
c. 4-methoxyphenyl isocyanate,
d. 3-(trifluoromethyl)phenyl isocyanate,
e. 4-methylthiophenyl isocyanate,
f. 2-benzyloxyphenyl isocyanate, and
g. 4-nitrophenyl isocyanate there can be obtained respectively
a. 1-(pentachlorophenyl)-3-(1-tolyl-2-piperidinylene)urea,
b. 1-(4-bromo-2-methylphenyl)-3-(1-tolyl-2-piperidinylene)urea,
c. 1-(4-methoxyphenyl)-3-(1-tolyl-2-piperidinylene)urea.
d. 1-[3-(trifluoromethyl)phenyl]-3-(1-tolyl-2-piperidinylene)-urea,
e. 1-(4-methylthiophenyl)-3-(1-tolyl-2-piperidinylene)urea,
f. 1-(2-benzyloxyphenyl)-3-(1-tolyl-2-piperidinylene)urea, and
g. 1-(4-nitrophenyl)-3-(1-tolyl-2-piperidinylene)urea.

Following the general procedure hereinbefore described for the hydrogenation of nitro and benzyloxy substituents the following compounds:
a. 1-(2-benzyloxyphenyl)-3-(1-tolyl-2-piperidinylene)urea and
b. 1-(4-nitrophenyl)-3-(1-tolyl-2-piperidinylene)urea can be converted to respectively:
a. 1-(2-hydroxyphenyl)-3-(1-tolyl-2-piperidinylene)urea and
b. 1-(4-aminophenyl)-3-(1-tolyl-2-piperidinylene)urea.

Following a procedure similar to that described in Example 9A but substituting for 2-imino-1-phenylpyrrolidine hydrochloride an equivalent amount of 2-imino-1-(4-chlorophenyl)-4-methylpyrrolidine hydrochloride there can be obtained 1-(4-chlorophenyl)-3-[1-(4-chlorophenyl)-4-methyl-2-pyrrolidinylene)urea.

I claim:
1. A compound of the formula

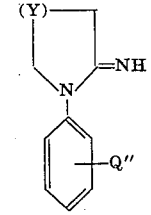

where Q" is one to five substituents of the group consisting of lower-alkoxy, phenyl-lower-alkoxy, trifluoro-methoxy, lower-alkanoyloxy, di(lower-alkyl)amino, lower-alkanoylamino, lower-alkylsulfonyl, lower-alkylsulfinyl, lower-alkylthio, trifluoromethyl nitro and halo;
and Y is alkylene of one to three carbon atoms.

2. 2-Imino-1-(4-trifluoromethoxyphenyl)piperidine according to claim 1.

3. A compound according to claim 1 where Q'' is one to five halo substituents.

4. 2-Imino-1-(4-chlorophenyl)pyrrolidine according to claim 3.

5. 2-Imino-1-(4-chlorophenyl)-4-methylpyrrolidine according to claim 3.

6. 2-Imino-1-(4-chlorophenyl)piperidine according to claim 3.

7. 2-Imino-1-(3-chlorophenyl)piperidine according to claim 3.

8. 2-Imino-1-(4-fluorophenyl)piperidine according to claim 3.

9. 2-Imino-1-phenylpiperidine.

10. 2-Imino-1-(4-tolyl)piperidine.

* * * * *

UNITED STATES PATENT AND TRADEMARK OFFICE
CERTIFICATE OF CORRECTION

PATENT NO. : 3,717,648
DATED : February 20, 1973
INVENTOR(S) : Guy D. Diana

It is certified that error appears in the above-identified patent and that said Letters Patent are hereby corrected as shown below:

Column 1, Formula I, " 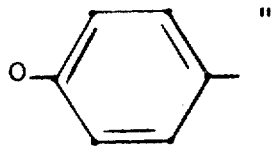 " should read -- 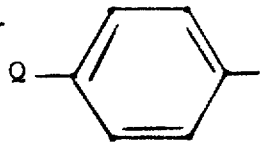 --.

Column 4, Formula IX, " 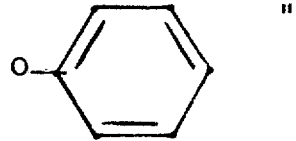 "

should read -- 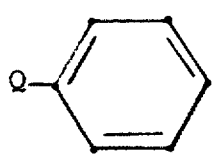 --.

Column 4, Formula X, " 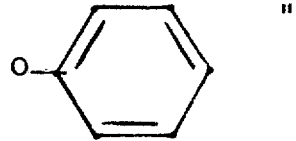 "

should read -- 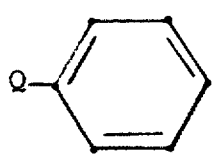 --.

UNITED STATES PATENT AND TRADEMARK OFFICE
CERTIFICATE OF CORRECTION

PATENT NO. : 3,717,648
DATED : February 20, 1973
INVENTOR(S) : Guy D. Diana

It is certified that error appears in the above-identified patent and that said Letters Patent are hereby corrected as shown below:

Column 4, Formula XIII, " 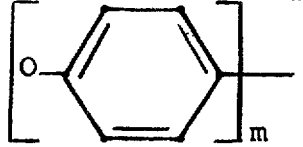 "

should read -- 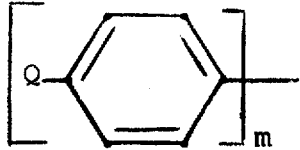 --.

Column 5, Formula XIV, " 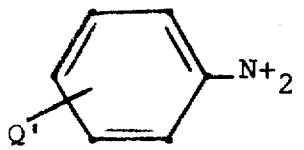 "

should read -- 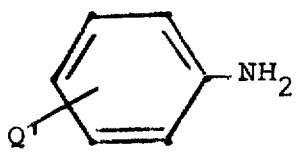 --.

Column 6, lines 64-65, "-CH(CH$_3$)CH$_{2c}$-" should read -- -CH(CH$_3$)CH$_2$- --.

Column 7, line 45, "a" should be deleted.

Column 30, line 64, "trifluoromethyl nitro" should read -- trifluoromethyl, nitro --.

Signed and Sealed this

First Day of March 1977

[SEAL]

Attest:

RUTH C. MASON
Attesting Officer

C. MARSHALL DANN
Commissioner of Patents and Trademarks